A. ELWERTOSKI.
FURNITURE CASTER.
APPLICATION FILED NOV. 10, 1917.
1,270,390.
Patented June 25, 1918.
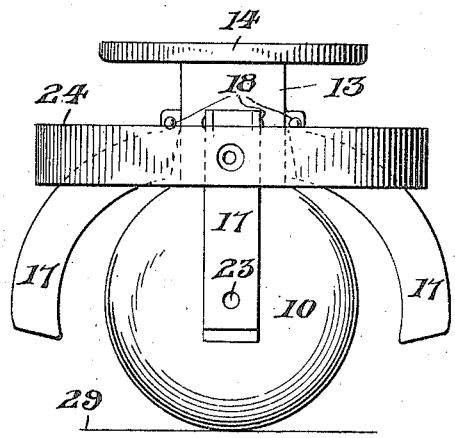
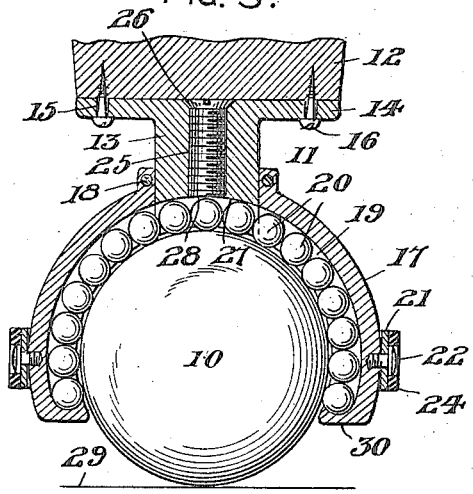
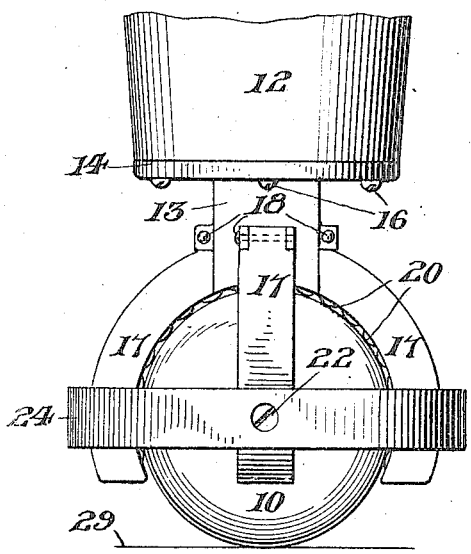
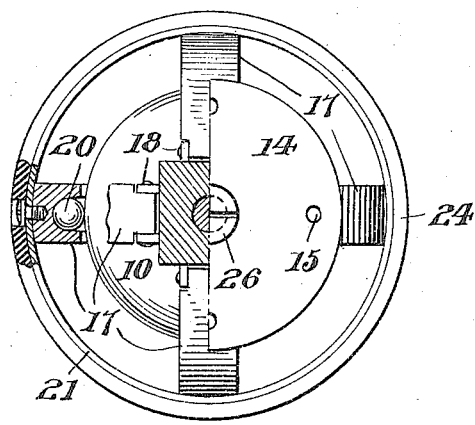
Inventor
A. Elwertoski
By N. M. Wilson
Attorney

UNITED STATES PATENT OFFICE.

ANTONI ELWERTOSKI, OF DUMONT, NEW JERSEY, ASSIGNOR OF ONE-THIRD TO TOMASZ SZALEWICZ, OF FORT EDWARD, NEW YORK.

FURNITURE-CASTER.

1,270,390.  Specification of Letters Patent.  Patented June 25, 1918.

Application filed November 10, 1917. Serial No. 201,248.

*To all whom it may concern:*

Be it known that I, ANTONI ELWERTOSKI, a citizen of Russia, residing at Dumont, in the county of Bergen and State of New Jersey, have invented certain new and useful Improvements in Furniture-Casters, of which the following is a specification.

This invention relates to new and useful improvements in furniture casters.

The primary object of the invention is the provision of a ball-bearing caster especially adapted for use in movably supporting articles of furniture, the anti-friction members employed being readily removable and adapted to be replaced for the purpose of making repairs.

A further object of the device is the provision of a ball caster having an adjustable anti-friction mounting bearing, the structure possessing great strength and providing a support readily movable upon a fixed surface for easily moving the supported article as found desirable.

A still further object of the device is the provision of a ball caster arranged for readily inserting and removing anti-friction ball members from the structure when detached from an article of furniture which the caster is adapted to support, further means being arranged for adjusting as well as releasing the ball bearings when the device is in its operative position.

In the drawing forming a part of this application and in which like designating characters refer to corresponding parts throughout the several views, Figure 1 is a side elevation of the device detached with the bearing members released.

Fig. 2 is a similar view of the device in its operative arrangement.

Fig. 3 is a central, vertical, sectional view of the device as shown in Fig. 2 and Fig. 4 is a view of the device partially in top plan and partly in section.

Referring more in detail to the drawing, the device broadly consists of a ball or spherical member 10 mounted within a bracket 11 and adapted to be secured to the bottom of a table leg 12 or any other article of furniture. The bracket 11 comprises a post 13 having a plate 14 at its upper end provided with perforations 15 through which hold fast devices such as screws 16 extend and project into the leg 12 for operatively mounting the caster thereon.

Swinging arms or arcuate cages 17 are hinged as at 18 at diametrically opposite points upon the post 13 and are provided with ball races or grooves 19 within which anti-friction balls 20 are arranged in contact with the ball 10. The cages 17 are provided with end walls 30 at the ends of the races 19 for retaining the balls 20 in position. A retaining annulus 21 is arranged surrounding the cages 17 being adapted for adjustment thereon normally maintained in a horizontal position and in a plane parallel with the plate 14 by means of screws 22 extending through the annulus 21 and engaging within threaded sockets 23 in the outer sides of the cages 17. A buffer ring 24 formed of cushioning material such as cork or rubber is preferably carried by the annulus 21, it being noted that the diameter of the ring 24 is greater than that of the plate 14 whereby any objects will be engaged by the ring 24 when the device is moved about when in active operation.

The post 13 is provided with a central axial bore 25 readily permitting the insertion of a plurality of the anti-friction balls 20 therethrough for filling the cage races 19 therewith while a screw plug 26 is provided for the bore 25 to close the same when the races are filled. The inner face 27 of the post 13 as well as the inner end 28 of the plug 26 are suitably concaved for providing an even curvature alining with the inner faces of the cages 17 for the accommodation of the anti-friction balls 20.

It will be understood that when the device is assembled as illustrated in Fig. 3 of the drawing the furniture 12 may be readily rolled about upon the floor or support 29 and upon removing the caster from the leg 12 by removing the screws 16, the plug 26 may be removed and the balls 20 allowed to pass outwardly through the bore 25. New anti-friction balls may then be inserted through the bore 25 into the races 19 and the plug 26 returned to its retaining position. The screws 22 may be removed and the annulus 21 being thereby released may be elevated as shown in Fig. 1 of the drawing for releasing the balls 20 which will drop downwardly out of the races 19 and upon again replacing the annulus 21 and securing the same by means of the screws 22 the ball 10 will be retained in position free to rotate but without the provision of the ball bearing features. A serviceable anti-friction ball caster is arranged that is capable of supporting great loads for ease in moving about and while the present form of the invention is believed to be preferable changes may be made therein without departing from the scope of the appended claims.

What I claim is:—

1. A caster comprising a spherical member, an attaching plate, a post carried by said plate, arcuate cages swingingly carried by said post having longitudinal grooves in their inner faces, anti-friction balls within said grooves normally in contact with said spherical member, and a retaining annulus outwardly arranged and connecting said cages.

2. A caster comprising a spherical member, an attaching means, outwardly movable arcuate cages carried by said attaching means having longitudinal grooves in their inner faces extending substantially from end to end thereof, anti-friction balls within said grooves normally in contact with said spherical member, and retaining means for said cages to hold the anti-friction balls into contact with said spherical member.

3. A caster comprising a spherical member, an attaching plate, a post carried by said plate having an axial bore therethrough, arcuate cages swingingly carried by said post having longitudinal grooves on their inner faces, anti-friction balls within the said grooves in contact with said spherical member, a closure plug for said bore and a retaining annulus outwardly arranged connecting the said cages.

In testimony whereof I affix my signature.

ANTONI ELWERTOSKI.

Copies of this patent may be obtained for five cents each, by addressing the "Commissioner of Patents, Washington, D. C."